(12) United States Patent
Shin (10) Patent No.: US 7,723,635 B2
(45) Date of Patent: May 25, 2010

(54) ELECTRODE WIRE FOR ELECTRIC DISCHARGE MACHINING AND MANUFACTURING METHOD OF THE SAME

(75) Inventor: Hyun-Sik Shin, Suwon (KR)

(73) Assignee: MACT Co., Ltd., Shiheung (KR)

( * ) Notice: Subject to any disclaimer, the term of this patent is extended or adjusted under 35 U.S.C. 154(b) by 1163 days.

(21) Appl. No.: 11/222,072

(22) Filed: Sep. 8, 2005

(65) Prior Publication Data

US 2006/0219666 A1  Oct. 5, 2006

(30) Foreign Application Priority Data

Apr. 1, 2005  (KR)  ............... 10-2005-0027540

(51) Int. Cl.
*B23K 9/00* (2006.01)
*B23H 7/00* (2006.01)

(52) U.S. Cl. ............... 219/69.15; 219/69.11; 219/69.12; 428/615; 428/621

(58) Field of Classification Search ............... 219/69.11
See application file for complete search history.

(56) References Cited

U.S. PATENT DOCUMENTS

| | | | | |
|---|---|---|---|---|
| 4,287,404 A | * | 9/1981 | Convers et al. | 219/69.12 |
| 4,341,939 A | * | 7/1982 | Briffod et al. | 219/69.12 |
| 4,373,127 A | * | 2/1983 | Haskett et al. | 219/69.15 |
| 4,686,153 A | | 8/1987 | Tominaga et al. | 428/610 |
| 5,206,480 A | * | 4/1993 | Nakai et al. | 219/69.12 |
| 5,599,633 A | * | 2/1997 | Miyazaki et al. | 428/675 |
| 5,808,262 A | * | 9/1998 | Mukherjee | 219/69.12 |
| 5,945,010 A | | 8/1999 | Tomalin | 219/69.12 |
| 6,291,790 B1 | * | 9/2001 | Nakai et al. | 219/69.12 |
| 6,306,523 B1 | | 10/2001 | Seong | 428/613 |
| 6,362,447 B2 | | 3/2002 | Shimojima et al. | 219/69.12 |
| 6,447,930 B2 | | 9/2002 | Barthel et al. | 428/621 |
| 6,781,081 B2 | * | 8/2004 | Groos et al. | 219/69.12 |
| 2002/0092831 A1 | * | 7/2002 | Seong | 219/69.12 |

* cited by examiner

*Primary Examiner*—Tu B Hoang
*Assistant Examiner*—Brian Jennison
(74) *Attorney, Agent, or Firm*—Glifford, Krass, Sprinkle, Anderson & Citkowski, P.C.

(57) ABSTRACT

Enhanced electrode discharge machining properties of an electrode wire are achieved when the electrode wire comprises a coil, a covering layer formed on a periphery of the coil, and grains formed on the covering layer. The grains comprise a copper-zinc alloy including about 0.01 to 0.5 weight % of at least one additive element selected from the group consisting of aluminum, tin, magnesium, lanthanum, cerium, nickel, manganese, titanium, and zirconium.

9 Claims, 11 Drawing Sheets

ELECTRODE WIRE FOR ELECTRIC DISCHARGE MACHINING AND MANUFACTURING METHOD OF THE SAME

CROSS-REFERENCE TO RELATED APPLICATION

This application claims priority to, and the benefit of, Korean Patent Application 10-2005-0027540 filed in the Korean Intellectual Property Office on Apr. 1, 2005, the entire content of which is incorporated herein by reference.

BACKGROUND OF THE INVENTION (a) Field of the Invention

The present invention relates to an electrode wire for electric discharge machining and a manufacturing method of the same. In particular, the present invention relates to an electrode wire for electric discharge machining having enhanced characteristics, and a manufacturing method of the same.

(b) Description of the Related Art

In general, electric discharge machining machines a work piece by a discharge that generates between an electrode wire and the work piece. In more detail, a portion of a work piece is melted by spark discharge or arc discharge that generates between an electrode wire and the work piece when the electrode wire passes through the work piece, and the molten portion of the work piece is removed, thereby cutting the work piece.

As mentioned above, since the work piece is cut by the discharge that generates between the electrode wire and the work piece, characteristics of the electrode wire, that is, composition, phase, or diameter, significantly affect properties of electric discharge machining. Therefore, when the characteristics of the electrode wire are inferior, a portion of the electrode wire exfoliates and dust generates. In addition, it can bring about disconnection of the electrode wire at the process of electric discharge machining or wire drawing.

Therefore, in order to enhance properties of electric discharge machining and prevent the generation of dust and disconnection of the electrode wire, it is required that an electrode wire having high tensile strength, high electrical conductivity, and uniform structure is used for the electric discharge machining.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an electrode wire having an advantage of enhancing properties of electric discharge machining by increasing electrical conductivity and tensile strength of the electrode wire, and a manufacturing method of the same.

In an exemplary electrode wire for electric discharge machining according to an embodiment of the present invention, a covering layer is formed on a periphery of a core, and grains are formed on the covering layer. The grains comprise a copper-zinc alloy including about 0.01 to 0.5 weight % of at least one additive element selected from the group consisting of aluminum, tin, magnesium, lanthanum, cerium, nickel, manganese, titanium, and zirconium.

The grains may be spaced from one another on a periphery of the covering layer. An oxide layer may be formed to cover the grains and a portion of the covering layer which is exposed between the grains. The covering layer may comprise about 37 to 49.5 weight % of zinc, with the balance being of copper and a trace of unavoidable impurities. The covering layer may have a thickness of about 2 to 3 μm. Further, the grains may comprise about 49.5 to 58 weight % of zinc and about 0.01 to 0.5 weight % of the at least one additive element, with the balance being of copper and a trace of unavoidable impurities. The electrode wire may have a diameter of about 0.15 to 0.3 mm.

Selectively, the grains may form a layer covering the periphery of the covering layer. An oxide layer may be formed to cover the grains. The covering layer may comprise about 46.2 to 49.5 weight % of zinc, with the balance being of copper and a trace of unavoidable impurities. The covering layer may have a thickness of about 2 to 3 μm. Further, the grains may comprise about 49.5 to 58 weight % of zinc and about 0.01 to 0.5 weight % of the at least one additive element, with the balance being of copper and a trace of unavoidable impurities. The electrode wire may have a diameter of about 0.85 to 1.25 mm.

The grains may have an average grain size of about 3 to 5 μm.

The core may comprise copper and a trace of unavoidable impurities. Selectively, the coil may comprise about 10 to 40 weight % of zinc, with the balance being of copper and a trace of unavoidable impurities.

Thus, the core may comprise copper or an α phase copper-zinc alloy, the covering layer may comprise an (α+β) phase copper-zinc alloy or a β phase copper-zinc alloy, and the grains may comprise a (β+γ) phase copper-zinc alloy.

According to such an exemplary electrode wire, a periphery portion (that is, periphery or a portion adjacent to the periphery) of the electrode wire substantially serving for electric discharge machining comprises β phases having a high electrical conductivity. Thus, the electrode wire has enhanced properties of electric discharge machining due to the β phases.

Also, the grains of the covering layer are dispersed uniformly and minutely at the periphery portion and the covering layer having β phases of high tensile strength is thickly formed, thereby enhancing the tensile strength of the electrode wire and the adhesion force of the periphery of the electrode wire. Finally, properties of electrical discharge machining is improved, and dust, which is generated by exfoliation of the periphery of the electrode wire, decreases, and disconnection of the electrode wire can be prevented.

Also, since the core of the electrode wire comprises copper or an α phase copper-zinc alloy, cold work workability of the electrode wire is enhanced.

According to an embodiment of the present invention, a manufacturing method of an electrode wire for electric discharge machining comprises a step of forming a coating layer on a periphery of a core comprising copper or a copper-zinc alloy, and a step of performing heat treatment on the core having the coating layer at about 300 to 950° C. to form an electrode wire. At the step of forming the coating layer, the core is dipped in a galvanizing bath of molten zinc including about 0.01 to 0.5 weight % of at least one additive element selected from the group consisting of aluminum, copper, tin, magnesium, lanthanum, cerium, nickel, manganese, titanium, and zirconium.

At the step of performing heat treatment, the coil having the coating layer may be passed through a thermos tunnel. After the step of performing heat treatment, a step of drawing the electrode wire may be performed.

Finally, after the step of drawing the electrode wire, a step of annealing may be performed at about 400 to 500° C.

In such a manufacturing method of an electrode wire, since the heat treatment is performed on the coil having the coating layer, the covering layer of β phases is formed by diffusion at the periphery portion of the electrode wire adjacent to the core, and the phases of the periphery of the electrode wire are transformed to (β+γ) phases. Also, grains of the (β+γ) phases uniformly and minutely disperse at the periphery by recovery, recrystallization, and grain growth.

In addition, the core having the coating layer may be passed through the thermos tunnel at the heat treatment step, and thus cooling of the electrode wire is effectively prevented and the effect of the heat treatment is maximized.

DETAILED DESCRIPTION OF THE EMBODIMENTS

An embodiment of the present invention will hereinafter be described in detail with reference to the accompanying drawings.

Figure 1:
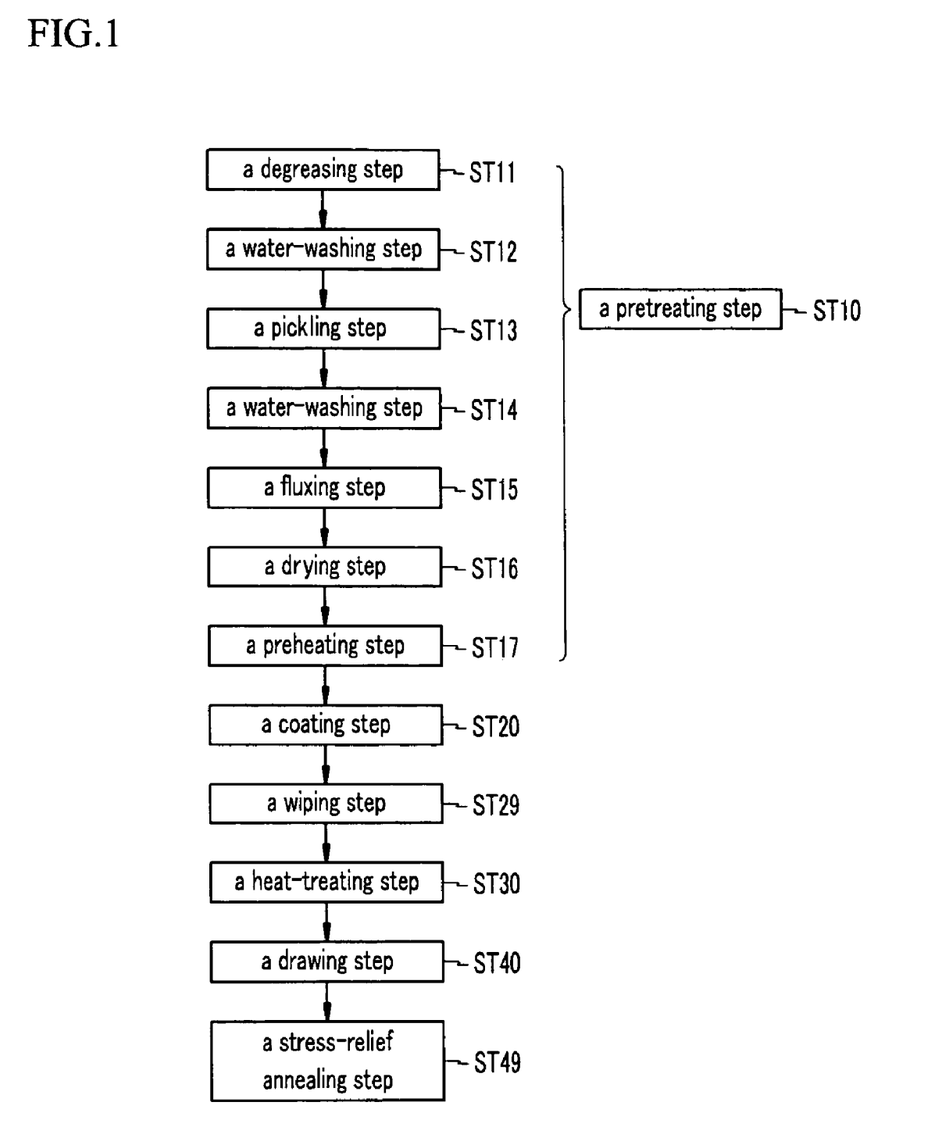
FIG. 1 is a flow chart illustrating a manufacturing method of an electrode wire for electrical discharge machining according to the present invention.
Figure 2:
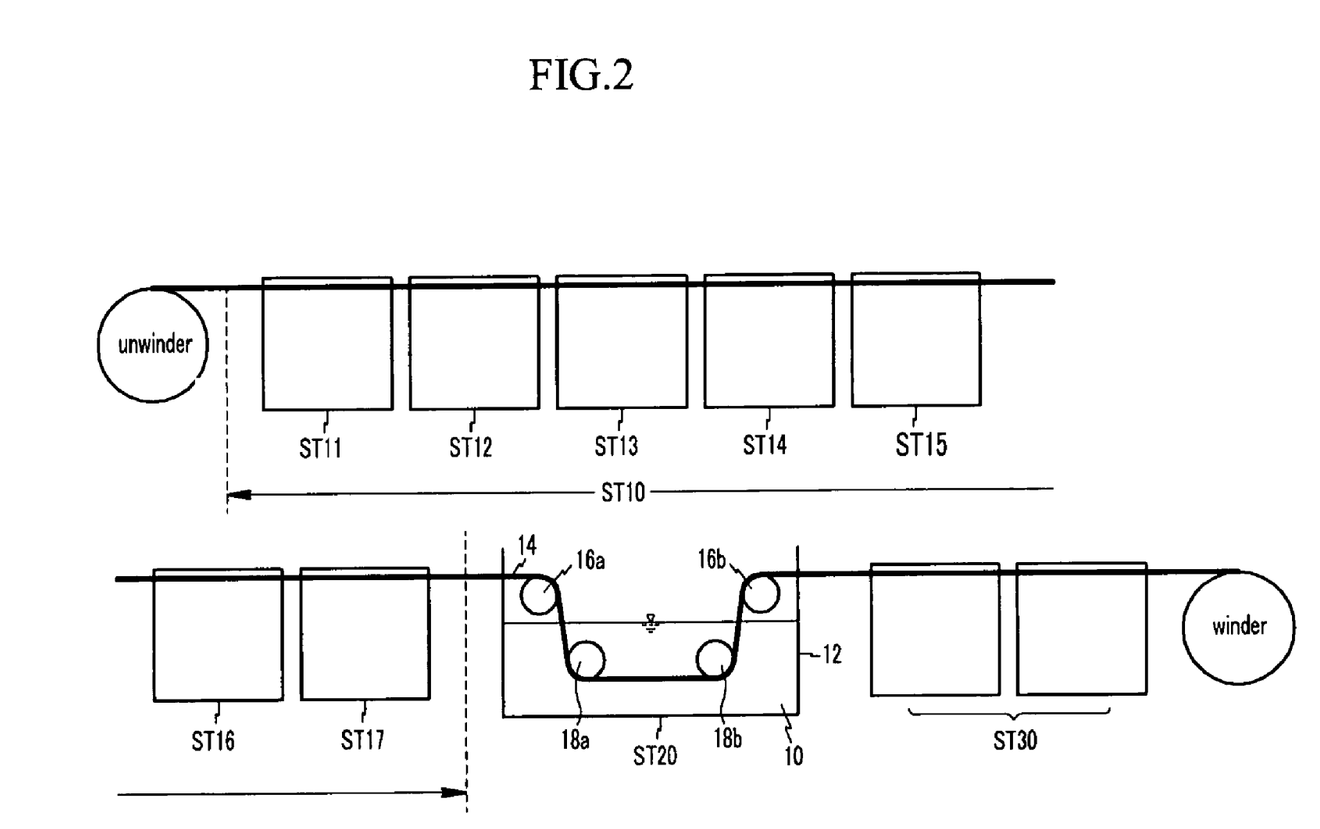
FIG. 2 is a schematic view partially illustrating the manufacturing method of the electrode wire for electrical discharge machining according to the present invention.

FIG. 1 is a flow chart illustrating a manufacturing method of an electrode wire for electrical discharge machining according to the present invention. FIG. 2 is a schematic view partially illustrating the manufacturing method of the electrode wire for electrical discharge machining according to the present invention.

As shown in FIG. 1, a manufacturing method of an electrode wire according to the present invention comprises a pretreating step ST10, a coating step ST20, a wiping step ST29, a heat-treating step ST30, a drawing step ST40, and a stress-relief annealing step ST49.

As shown in FIG. 2, a coil unwinds from an unwinder and passes each bathtub which is subjected to each step of the pretreating step ST10, the coating step ST20, and the heat-treating step ST30, and winds onto a winder. The drawing step ST40 and the stress-relief annealing step ST49 can be performed in separate devices. The above manufacturing method shown in FIG. 2 is an exemplary method and the present invention is not limited thereto.

Firstly, in the manufacturing method of the electrode wire according to the present invention, a core is prepared. The core may include copper and a trace of unavoidable impurities. Alternatively, the core may include about 10 to 40 weight % zinc, with the balance being of copper and a trace of unavoidable impurities. Here, the core which includes about 10 to 40 weight % zinc is an α phase copper-zinc alloy.

Here, zinc is added to increase the tensile strength of the core. When the content of zinc is less than about 10 weight %, the effect of increasing tensile strength is insufficient. On the other hand, when the content of zinc exceeds about 40 weight %, disconnection of the electrode wire may occur or cracks may generate at the drawing step ST30. This is because a copper-zinc alloy that includes over about 40 weight % of zinc has (α+β) phases and the cold working of β phases is generally difficult. Therefore it is preferable that the content of zinc is in the range of about 10 to 40 weight %.

The core may have a diameter of about 0.85 to 1.25 mm. However, it is notable that the present invention is not limited thereto. To the contrary, it should be understood that cores may have various diameters in the present invention.

As shown by FIG. 1, the core is subjected to the pretreating step ST10. A degreasing step ST11, a water-washing step ST12, a pickling step ST13, a water-washing step ST14, a fluxing step ST15, a drying step ST16, and a preheating step ST17 are carried out in sequence at the pretreating step ST10. The pretreating step ST10 improves characteristics of the coating layer to be formed at the coating step ST20.

Contamination materials that are stuck to a periphery of the coil are removed at the degreasing step ST11. When contamination materials, especially fat, remain on the periphery of the core even a little, the adhesive force of the coating layer to be formed at the coating step ST20 decreases and it generates defects of plating. Therefore, the contamination materials are removed at the degreasing step ST11 to prevent the above problems.

The core is washed by warm water of about 30 to 50° C. at the water-washing step ST12. The water-washing step ST12 also functions as maintaining a low concentration of contamination materials in the bathtubs of each step.

The minute oxidation scales that are stuck to the periphery of the core are removed and the periphery of the core is activated at the pickling step ST13. At the pickling step ST13, it is preferable that acid having a suitable concentration and temperature is used considering characteristics of the coil.

The coil is washed by warm water of about 30 to 50° C. at the water-washing step ST14. The water-washing step ST14 also functions as maintaining a low concentration of contamination materials in the bathtubs of each step.

Fluxes are formed on the periphery of the core to prevent oxidation of the periphery of the core and to activate the periphery of the core at the fluxing step ST15. The fluxes formed on the periphery of the core are removed when the core is dipped in a galvanizing bath at the coating step ST20.

Moisture which remains in the fluxes is completely removed at the drying step ST16. In general, the moisture which remains in the fluxes has a bad influence at the coating step ST20, and so is removed at the drying step ST16.

The core is preheated at the preheating step ST17 before the coating step ST20. The diffusion of the coating step ST20 is activated thereby facilitating the formation of the coating layer at the coating step ST20 by the preheating step ST17.

Subsequently, as shown in FIG. 2, a coating layer is formed on the core 14 by dipping and passing the core 14 in a bathtub 12 filled with a galvanizing bath 10 of molten zinc at the step ST20. When the core 14 dips and passes through the bathtub 12 filled with the galvanizing bath 10, zinc of the galvanizing bath 10 diffuses inside the core 14 and the coating layer is formed on the periphery of the core 14. Hereinafter, the core 14 having a coating layer and/or a diffusion layer and others is called an electrode wire.

In this case, at least one additive element is added to the galvanizing bath 10 of molten zinc in an amount ranging from about 0.01 to 0.5 weight % to improve the fluidity of the galvanizing bath and the corrosion resistance of the electrode wire and to refine the grains of the electrode wire.

When the content of the additive element is less than about 0.01 weight %, the effect of increasing the corrosion resistance of the electrode wire and grain refining is insufficient. On the other hand, when the content of the additive element exceeds about 0.5 weight %, it may decrease the electrical conductivity of the electrode wire. Further, when the content of the additive element is about from 0.01 to 0.5 weight %, the fluidity of the galvanizing bath 10 may improve.

The at least one additive element is selected from the group consisting of aluminum, copper, tin, magnesium, lanthanum, cerium, nickel, manganese, titanium, and zirconium. It is preferable that the additive element is added in a proper amount by a proper type of pure metal or a master alloy considering the density of the additive element, the temperature of the galvanizing bath 10, and the size of the bathtub 12 which is filled with the galvanizing bath 10. For instance, when aluminum is added as the additive element, it may be considered that the density of aluminum is larger than the density of zinc and aluminum is mostly positioned in the upper part of the galvanizing bath 10 such that the concentration of aluminum is high at the upper part of the galvanizing bath 10.

A thickness of the coating layer may be controlled by controlling coating conditions (for example, the temperature of the galvanizing bath 10, coating time, and so on). In the present invention, the coating layer may have a thickness of about from 5 to 15 μm by predetermined coating conditions. However, the thickness of the coating layer is changeable according to the characteristics of the coil and so on. Therefore, it is notable that the present invention is not limited thereto.

In FIG. 2, it is shown that a pair of first rolls 16a and 16b is positioned over the galvanizing bath 10 and a pair of second rolls 18a and 18b is positioned inside the galvanizing bath 10 at the coating step ST20. The first rolls 16a and 16b and second rolls 18a and 18b change the course of the core 14 and support the core 14 and move it in one direction. It is preferable that the second rolls 18a and 18b are positioned corresponding to each other and the temperature of a portion of the galvanizing bath 10 where the second rolls 18a and 18b are positioned is regularly maintained to form a coating layer with a uniform thickness.

However, it should be understood that the present invention is not limited to the above coating method and apparatus, since various coating methods and apparatuses may be applied.

The coating layer that is formed at the coating step ST20 comprises a copper-zinc alloy including zinc, copper, and the additive element that is added to the galvanizing bath to refine the grains. In this case, the coating layer is formed of a copper-zinc alloy having various phases (for example, β phases, γ phases, ε phases, (α+β) phases, (γ+ε) phases, and (β+γ) phases). Here, the β phase copper-zinc alloy includes about 46.2 to 49.5 weight % of zinc, with the balance being of copper and a trace of unavoidable impurities. The γ phase copper-zinc alloy includes about 58 to 72 weight % of zinc, with the balance being of copper and a trace of unavoidable impurities. The ε phase copper-zinc alloy includes about 78.2 to 87.5 weight % of zinc, with the balance being of copper and a trace of unavoidable impurities.

Since a periphery of the coating layer directly contacts zinc of the galvanizing bath, a concentration of zinc on the periphery is higher than that of the other portion. Accordingly, the periphery of the coating layer is formed of a ε phase copper-zinc alloy having a high zinc concentration.

Referring again to FIG. 1, the wiping step ST29 may be performed after the coating step ST20. The dross that is stuck to the periphery of the electrode wire is removed by wiping, while the uniform coating layer remains after the wiping step ST29. The dross is impurities that are created on the surface of the galvanizing bath or within the galvanizing bath. The dross on the surface of the galvanizing bath may be generated by oxidation between zinc and air or impurities of zinc lumps, and the dross within the galvanizing bath may be generated by the chemical reaction between zinc and materials of the bathtub (for instance, iron). Since the dross makes the periphery of the electrode wire rough and disturbs diffusion of zinc, it is preferable that the dross is removed after the coating step ST20. In the present invention, a method using a die which has holes of a predetermined size, an air wiping method, a method using charcoal, and other various methods, are applied at the wiping step ST29.

Subsequently, the heat-treating step ST30 is performed to form a diffusion layer of β phases thereby manufacturing a first electrode wire. Here, a first electrode wire designates an electrode wire to which the drawing step ST40 is not performed. The heat-treating step ST30 is performed for between 10 seconds to 2 minutes to maximize the effect of the heat-treating step ST30.

The heat treatment of the electrode wire may be preformed at about 300 to 950° C. This temperature is determined considering the transformation temperature from α phases to β phases. Also, when the temperature of the heat treatment is less than about 300° C., a diffusion rate is slow due to the low temperature and it is difficult to form a diffusion layer having a sufficient thickness. When the temperature of the heat treatment exceeds about 950° C., the electrode wire lengthens and it may generate disconnection of the electrode wire. In addition, it may generate dezincification of the coating layer and irregular grain growth.

The diffusion layer is formed inside the electrode wire, in more detail, in an adjacent portion of the core and the coating layer, by the heat treatment of the heat-treating step ST30. The diffusion layer may include the β phase copper-zinc alloy and have a uniform average grain size advantageous to cold working.

Also, a transformation happens at the periphery of the coating layer by the heat treatment of the heat-treating step ST30. That is, recovery, recrystallization and grain growth occur at the coating layer of irregular structures that is formed at the coating step ST20 and thus the periphery portion of the coating layer may have uniform grains. The additive element (for example, aluminum), which is added to the galvanizing bath to refine the grains and remains on the periphery of the electrode wire, is diffused by the heat treatment and has a role to refine the grains of the coating layer minutely and uniformly.

In this case, the coil having the coating layer (that is, the electrode wire) may be passed through a thermos tunnel at the heat-treating step ST30. Therefore, cooling of the electrode wire is effectively prevented. Accordingly, the effect of the heat treatment of the heat-treating step ST30 is maximized.

Additionally, a thin oxidation layer is formed covering the coating layer on the electrode wire at the heat-treating step ST30.

Hereinafter, the first electrode wire according to the present invention manufactured after the heat-treating step ST30 is described in detail with reference to FIG. 3.

Figure 3:
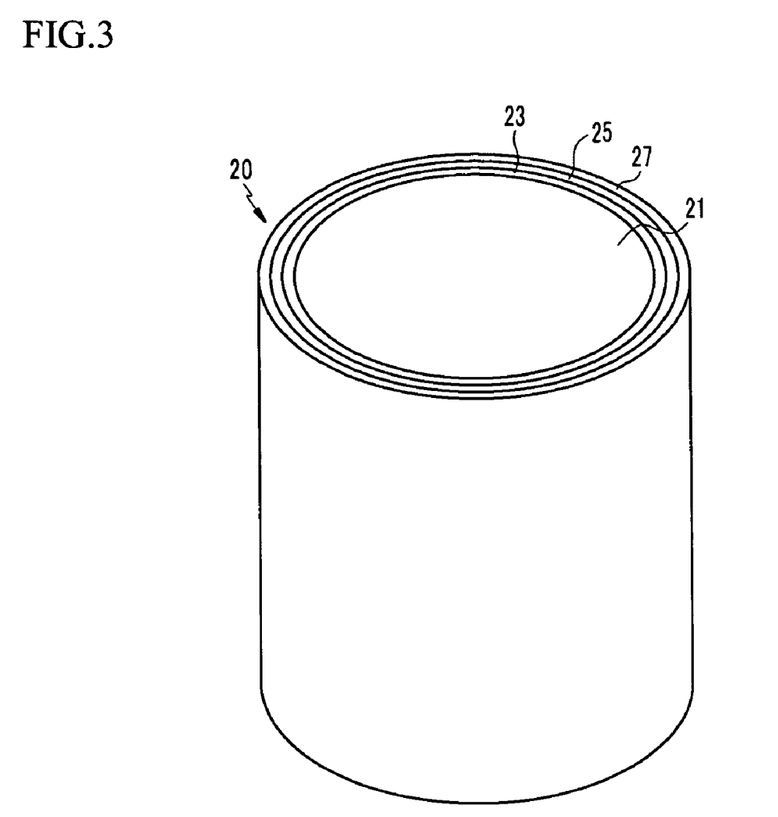
FIG. 3 is a partial perspective view of a first electrode wire for electrical discharge machining according to an embodiment of the present invention.

FIG. 3 is a partial perspective view of the first electrode wire for electrical discharge machining according to an embodiment of the present invention.

The first electrode wire 20 according to the embodiment of the present invention comprises a core 21, a first covering layer 23, and a second covering layer 25 formed on a periphery of the core 21 sequentially. In addition, an oxide layer 27 is further formed covering the second covering layer 25.

The core 21 comprises copper and a trace of unavoidable impurities. Alternatively, the core 21 comprises about 10 to 40 weight % of zinc, with the balance being of copper and a trace of unavoidable impurities.

The first covering layer 23 comprises about 46.2 to 49.5 weight % of zinc, with the balance being of copper and a trace of unavoidable impurities. Accordingly, the first covering layer 23 is formed of a β phase copper-zinc alloy. The first covering layer 23 is formed by diffusion at the heat-treating step.

Further, the first covering layer 23 has a thickness of about 2 to 3 μm. This thickness is suitable to enhance electrical conductivity and tensile strength, and also to inhibit occurrence of cracks at the drawing step ST40 to be subsequently performed. When the thickness of the first covering layer 23 is less than 2 μm, the increased electrical conductivity and tensile strength effects may be insufficient. On the other hand, when the thickness of the first covering layer 23 exceeds about 3 μm, it may generate cracks.

The second covering layer 25 is formed on a periphery of the first covering layer 23. The second covering layer 25 is formed of minute and uniform grains having an average grain size of about 3 to 5 μm by recovery, recrystallization and grain growth at the heat-treating step. The range of the average grain size is determined to uniformly form the grains, improve the tensile strength, and prevent cracks on the periphery of the first electrode wire 20.

The second covering layer 25 is formed by transforming an ϵ phase copper-zinc alloy to a (β+γ) phase copper-zinc alloy at the heat-treating step ST30. Accordingly, the second covering layer 25 comprises about 49.5 to 58 weight % of zinc and about 0.01 to 0.5 weight % of at least one additive element, with the balance being of copper and a trace of unavoidable impurities. The at least one additive element is selected from the group consisting of aluminum, tin, magnesium, lanthanum, cerium, nickel, manganese, titanium, and zirconium, and is added to the galvanizing bath at the coating step.

When the content of the additive element is less than about 0.01 weight %, the effects of increasing the corrosion resistance and refining the grains are insufficient. On the other hand, when the content of the additive element exceeds about 0.5 weight %, it decreases the electrical conductivity of the electrode wire and it generates cracks if the additive element has a segregation inclination.

Since the first covering layer 23 of the first electrode wire 20 is positioned at the periphery portion of the first electrode wire 20, the first covering layer 23 substantially serves for electric discharge machining. In the present invention, since the first covering layer 23 is formed of a β phase copper-zinc alloy having a high electrical conductivity, a portion of the first electrode wire 20 serving for electric discharge machining may have a high electrical conductivity. Also, since the second covering layer 25 which forms the periphery of the first electrode wire 20 is formed of uniform and minute grains, the first electrode wire 20 can have high tensile strength. That is, the properties of electric discharge machining of the first electrode wire 20 improve by enhancing the electrical conductivity and the tensile strength in the present invention.

Further, cold workability of the first electrode wire 20 improves since the coil 21 of a central portion of the first electrode wire 20 is formed of an α phase copper-zinc alloy and the first covering layer 23 is formed of a β phase copper-zinc alloy having a suitable grain size to the cold working by heat treatment.

Referring again to FIG. 1, subsequently, the first electrode wire is subjected to the drawing step ST40. At the drawing step ST40 the first electrode wire is drawn to manufacture a second electrode wire according to the present invention with a smaller diameter than the first electrode wire. Here, the second electrode wire designates the electrode wire to which the drawing step ST40 is performed.

At the drawing step ST40, cold drawing may be performed to the first electrode wire using a die for drawing. Therefore, a second electrode wire having a diameter of about 0.15 to 0.3 mm may be manufactured.

During the drawing step ST40, grains of (β+γ) phases of the second covering layer of the first electrode wire separate and the first covering layer of the first electrode wire is exposed between the grains of (β+γ) phases spaced from one another.

The stress relief annealing step ST49 may be performed to the second electrode wire after the drawing step ST40. At the stress relief annealing step ST49, an annealing process is performed to the second electrode wire at about 400 to 500° C. to remove a residual stress of the second electrode wire that is formed by the drawing of the drawing step ST40. It improves the tensile strength of the second electrode wire and the adhesion force of the second electrode wire.

The stress relief annealing step ST49 is performed for 1 second to 5 seconds. When the time of the annealing is less than 1 second, the effect of annealing is insufficient. On the other hand, when the time of the annealing exceeds 5 seconds, the tensile stress of the second electrode wire may decrease since the second electrode wire softens.

Hereinafter, the second electrode wire according to the present invention manufactured after the drawing step ST40 is described in detail with reference to FIG. 4.

Figure 4:
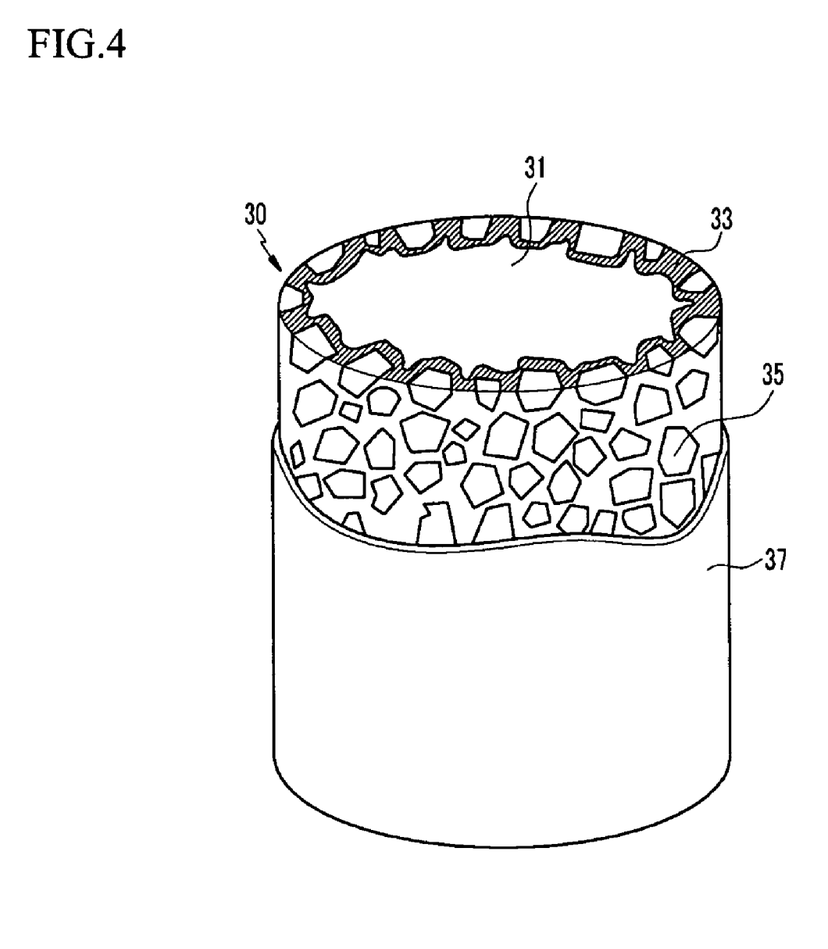
FIG. 4 is a partial perspective view of a second electrode wire for electrical discharge machining according to an embodiment of the present invention.

FIG. 4 is a partial perspective view of the second electrode wire for electrical discharge machining according to an embodiment of the present invention.

The second electrode wire 30 according to the present invention includes a core 31, a covering layer 33 formed on a periphery of the core 31, and grains formed 35 on the covering layer 33 spaced apart from one another by a predetermined gap. An oxide layer 37 that covers the grains 35 and a portion of the covering layer 33, which is exposed between the grains 35, may be further formed. Hereinafter, the effects of each of the predetermined sizes at the second electrode wire 30 are the same or similar with those at the first electrode wire, and therefore a detailed description of them will be omitted.

The core 31 comprises copper and a trace of unavoidable impurities. Alternatively, the core 31 comprises about 10 to 40 weight % of zinc, with the balance being of copper and a trace of unavoidable impurities.

The covering layer 33 comprises about 37 to 49.5 weight % of zinc, with the balance being of copper and a trace of unavoidable impurities. Accordingly, the covering layer 33 may be formed of an (α+β) phase copper-zinc alloy or a β phase copper-zinc alloy. The covering layer 33 may have a thickness of about 2 to 3 μm.

The grains 35 comprise about 49.5 to 58 weight % of zinc and about 0.01 to 0.5 weight % of at least one additive element, with the balance being of copper and a trace of unavoidable impurities, and thus the grains 35 are formed of a (β+γ) phase copper-zinc alloy. The at least one additive element is selected from the group consisting of aluminum, tin, magnesium, lanthanum, cerium, nickel, manganese, titanium, and zirconium that is added to the galvanizing bath at the coating step. The grains 35 are minute and uniform and the grains 35 have an average grain size of about 3 to 5 μm.

In the second electrode wire 30, the grains 35 of the (β+γ) phase copper-zinc alloy are spaced apart from one another and are positioned separately. Also, a portion of the covering layer 33 is exposed between the grains 35 and the portion of the covering layer 33, which is exposed between the grains 35, surrounds the grains 35.

The covering layer 33 of the β phase copper-zinc alloy having high electrical conductivity is exposed between the grains 35 and the covering layer 33 mostly forms the periphery of the second electrode wire 30 in the present invention. Accordingly, electrical conductivity of the second electrode wire 30 improves. Further, the tensile strength of the second electrode wire 30 improves since grains 35 are minutely and uniformly positioned on the periphery of the second electrode wire 30. Finally, it improves the properties of electric discharge machining (for example, stability, accuracy and so on).

The grains 35 of (β+γ) phase infiltrate from the periphery of the second electrode wire 30 toward the inside of the covering layer 33 at the second electrode wire 30, and thus they improve the adhesion force of the second electrode wire 30. Therefore, dust, which is generated by exfoliation of a portion of the electrode wire, is notably decreased, and adhesion of the dust to a work piece is prevented. In addition, disconnection of the electrode wire is also prevented.

Hereinafter, the first electrode wire according to the present invention will be described in detail through Embodiment 1 and Comparative Embodiment 1. The below-mentioned Embodiment 1 is an exemplary embodiment and the present invention is not limited to this.

Embodiment 1

A core having a diameter of 0.9 mm was prepared. Then the prepared core was subjected to a coating step and a heat-treating step according to the present invention to manufacture an electrode wire according to Embodiment 1.

Here, a galvanizing bath of molten zinc including 0.3 weight % of aluminum as an additive element was used at the coating step. A coating layer was formed with a thickness of about 5 to 10 μm at the coating step. And a diffusion layer of a β phase copper-zinc alloy was formed at the heat-treating step.

Comparative Embodiment 1

A core having a diameter of 0.9 mm was prepared. Then the prepared core was subjected to a coating step to manufacture an electrode wire according to Comparative Embodiment 1.

Here, the coating layer was formed with a thickness of about 5 to 10 μm. In Comparative Embodiment 1, the heat-treating step according to the present invention was not performed, contrary to Embodiment 1. All other conditions are the same as Embodiment 1.

Photographs of the electrode wires according to Embodiment 1 and Comparative Embodiment 1 were taken, and compositions of the peripheries of the electrode wires according to Embodiment 1 and Comparative Embodiment 1 were measured, respectively.

Figure 5:
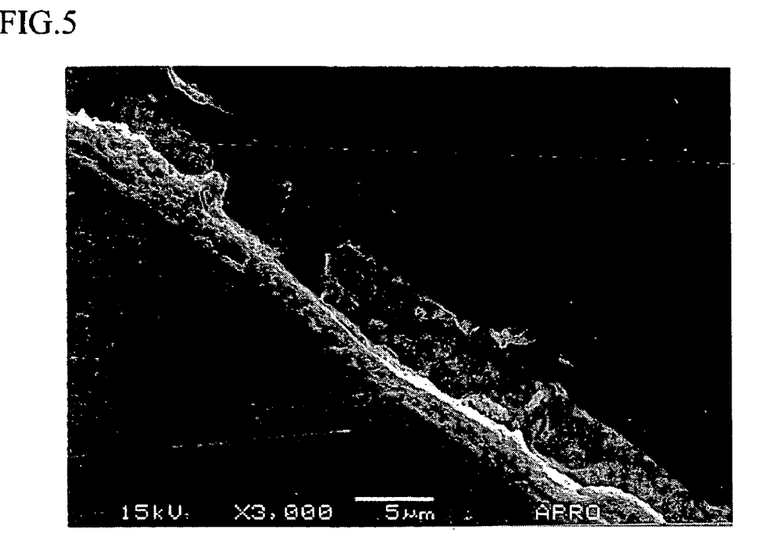
FIG. 5 is a photograph taken with 3000 times magnification of a cross section of an electrode wire of Embodiment 1 of the present invention.
Figure 6:
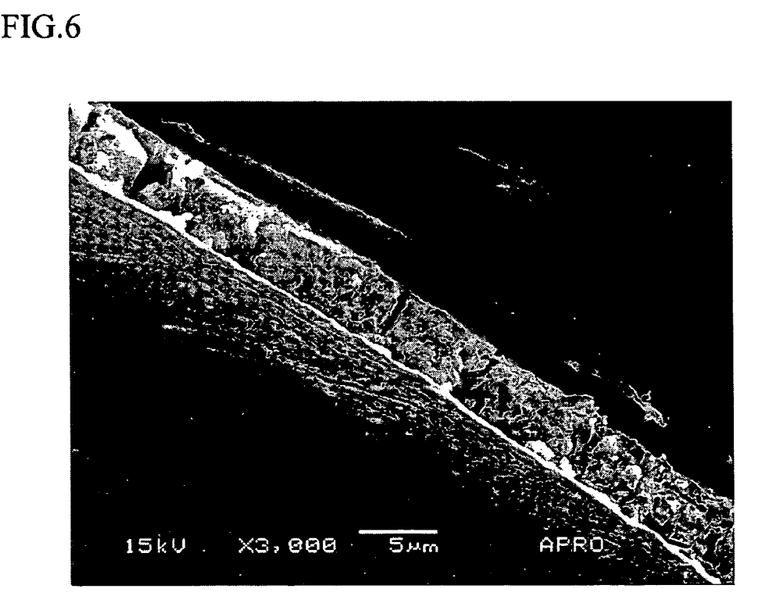
FIG. 6 is a photograph taken with 3000 times magnification of a cross section of an electrode wire of Comparative Embodiment 1.

FIG. 5 is a photograph taken with 3000 times magnification of a cross section of the electrode wire of Embodiment 1 of the present invention and FIG. 6 is a photograph taken with 3000 times magnification of a cross section of the electrode wire of Comparative Embodiment 1.

Referring to FIG. 5, it can be seen that a first covering layer, which is formed of a β phase copper-zinc alloy, was formed in a thickness ranging from 2 to 3 μm between a core and a second covering layer in the electrode wire according to Embodiment 1. However, referring to FIG. 6, it can be seen that a first covering layer, which is formed of a β phase copper-zinc alloy, was formed thinly (in a thickness ranging from about 0.2 to 0.5 μm) between a core and a second covering layer in the electrode wire according to Comparative Embodiment 1.

That is, since the first covering layer that is formed of a β phase copper-zinc alloy having high electrical conductivity was formed in a proper thickness at the periphery portion of the electrode wire according to Embodiment 1, the properties of electric discharge machining thereof improve.

Figure 7:
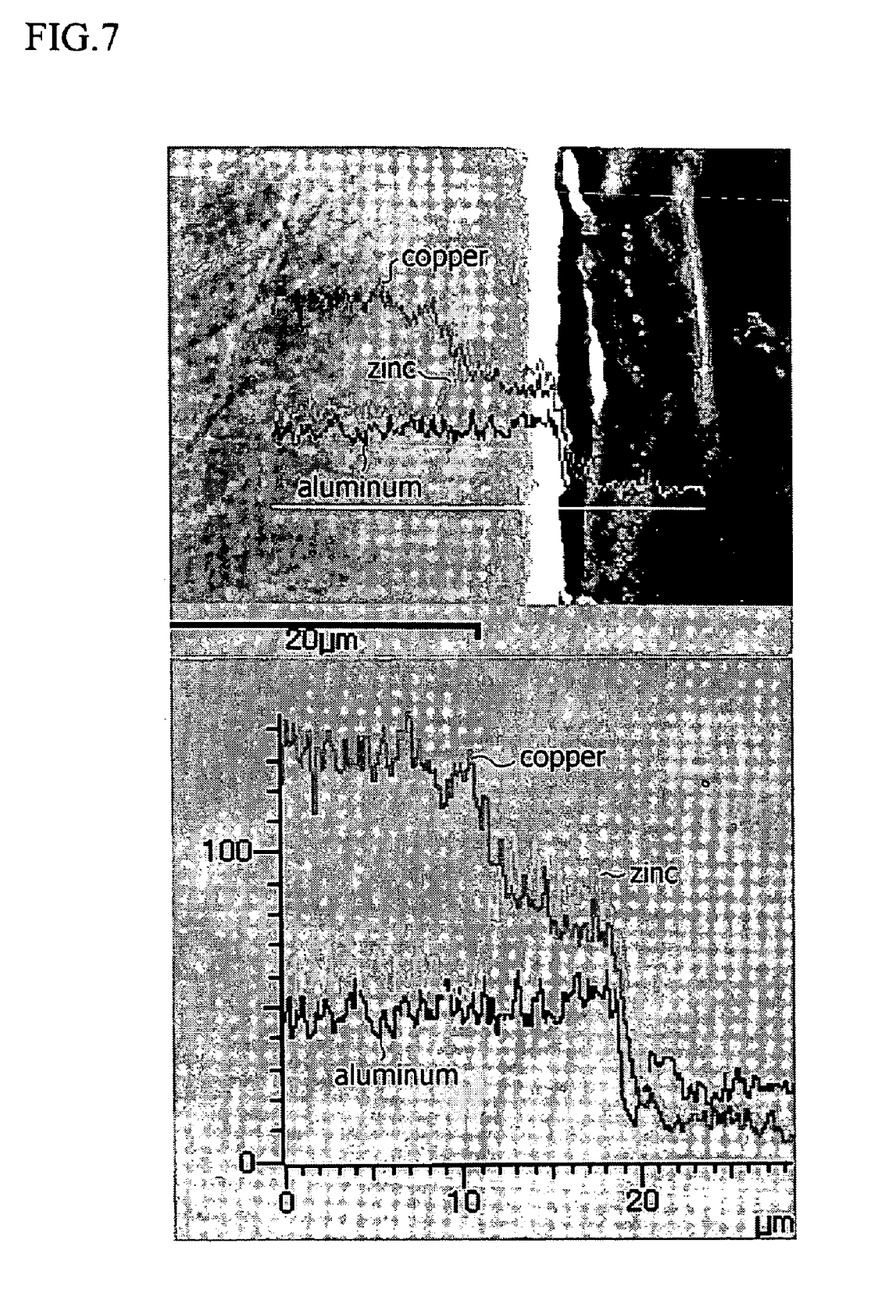
FIG. 7 is a composition-profile of copper, zinc, and aluminum of the electrode wire of Embodiment 1 of the present invention.
Figure 8:
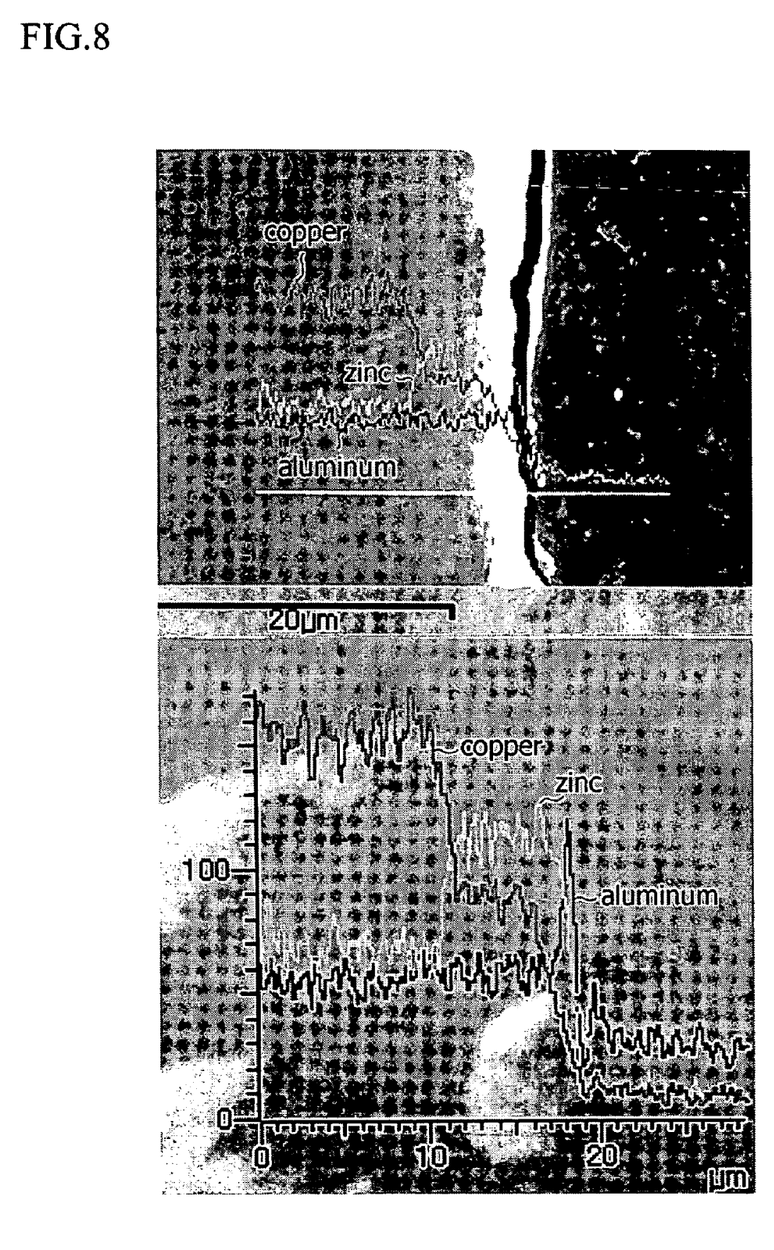
FIG. 8 is a composition-profile of copper, zinc, and aluminum of the electrode wire of Comparative Embodiment 1.

FIG. 7 is a composition-profile of copper, zinc, and aluminum of the electrode wire of Embodiment 1 of the present invention, and FIG. 8 is a composition-profile of copper, zinc, and aluminum of the electrode wire of Comparative Embodiment 1.

As shown in FIG. 7, it can be seen that the content of copper decreases as it goes from the core toward the periphery portion of the electrode wire according to Embodiment 1. That is, it can be seen that the composition of the periphery is different from the composition of the core in the electrode wire according to Embodiment 1. Further, it can be seen that the aluminum, which is added to the galvanizing bath at the coating step, disperses uniformly at the periphery of the electrode wire.

However, as shown FIG. 8, it can be seen that the content of aluminum increases suddenly at the periphery of the electrode wire according to Comparative Embodiment 1. This is because the aluminum that is added to the galvanizing bath at the coating step simply adheres to the periphery of the electrode wire according to Comparative Embodiment 1.

As mentioned above, it is confirmed that the aluminum, which is added to the galvanizing bath to refine the grains, uniformly disperses at the periphery of the electrode wire in Embodiment 1, contrary to the electrode wire in Comparative Embodiment 1. That is, it is predictable that the periphery of the electrode wire according to Embodiment 1 is formed of uniform and minute grains.

Figure 9A:
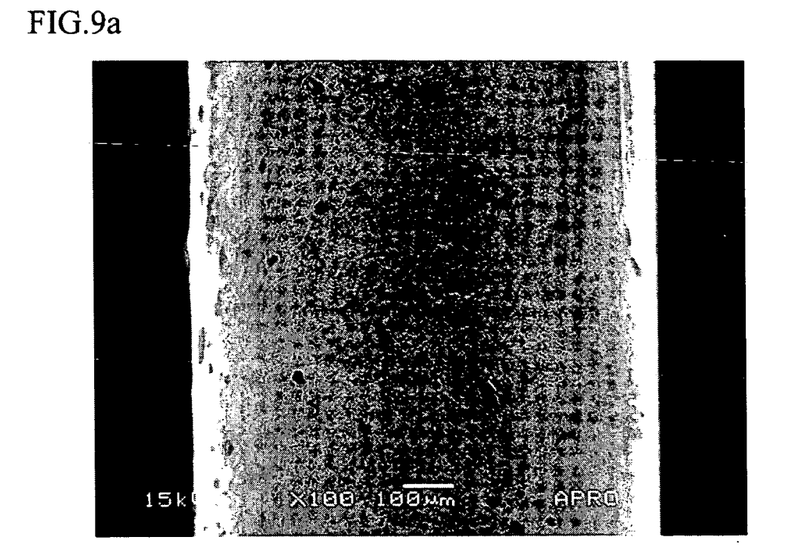
FIG. 9a is a photograph taken with 100 times magnification of a periphery of the electrode wire of Embodiment 1 of the present invention.
Figure 9B:
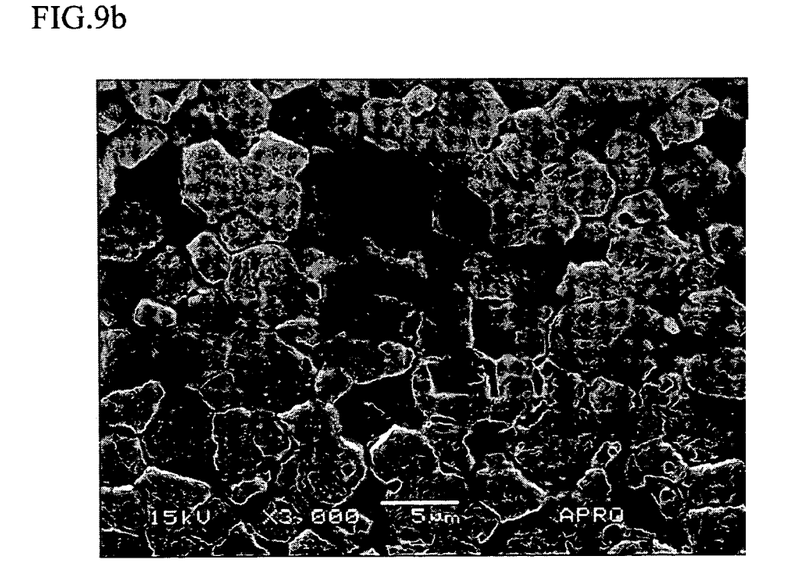
FIG. 9b is a photograph taken with 3000 times magnification of the periphery of the electrode wire of Embodiment 1 of the present invention.

FIG. 9a and FIG. 9b are photographs taken with 100 times and 3000 times magnification of the periphery of the electrode wire of Embodiment 1 of the present invention, respectively.

Referring to FIG. 9a, it can be seen that the periphery of the electrode wire according to Embodiment 1 is smooth. Referring to FIG. 9b, it can be seen that the periphery of the electrode wire according to Embodiment 1 is formed of uniform and minute grains having a grain size of about 3 to 5 μm. In this case, it can be seen that the grains forming the periphery of the electrode wire according to Embodiment 1 are shaped as hexagons.

That is, recovery, recrystallization, and grain growth are facilitated by performing heat treatment to the coating layer of irregular structures that is formed at the coating step, and thus, the periphery of the electrode wire according to Embodiment 1 is formed of minute and uniform grains. It is predictable that the aluminum dispersing uniformly at the periphery of the electrode wire, as shown FIG. 8, facilitates refining the grains.

Finally, the electrode wire according to Embodiment 1 may have high tensile strength due to the minute grains dispersing uniformly.

The composition of the periphery of the electrode wire according to the Embodiment 1 is shown in Table 1 and the composition of the periphery of the electrode wire according to Comparative Embodiment 1 is shown in Table 2. These were analyzed at the periphery of twelve electrode wires according to Embodiment 1 and twelve electrode wires according to Comparative Embodiment 1 using energy dispersive X-ray spectrometry (EDS).

TABLE 1

| | 1 | 2 | 3 | 4 | 5 | 6 | 7 | 8 | 9 | 10 | 11 | 12 |
|---|---|---|---|---|---|---|---|---|---|---|---|---|
| O [weight %] | 0.35 | 0.12 | 0.45 | 0.51 | 0.44 | 0.37 | 0.21 | 0.38 | 0.47 | 0.55 | 0.49 | 0.38 |
| Al [weight %] | 0.02 | 0.21 | 0.15 | 0.17 | 0.23 | 0.07 | 0.27 | 0.31 | 0.29 | 0.06 | 0.18 | 0.19 |
| Cu [weight %] | 44.9 | 44.6 | 44.4 | 39.9 | 45.6 | 46.6 | 45.1 | 43.4 | 44.9 | 43.8 | 44.9 | 44.9 |
| Zn [weight %] | 55.1 | 55.4 | 55.6 | 55.5 | 54.4 | 53.4 | 54.9 | 56.6 | 55.1 | 56.2 | 55.1 | 55.1 |
| phase | | | | | | $\beta + \gamma$ | | | | | | |

TABLE 2

| | 1 | 2 | 3 | 4 | 5 | 6 | 7 | 8 | 9 | 10 | 11 | 12 |
|---|---|---|---|---|---|---|---|---|---|---|---|---|
| Al [weight %] | 0.09 | 0.40 | 0.23 | 0.11 | 0.12 | 0.19 | 0.21 | 0.24 | 0.26 | 0.02 | 0.21 | 0.19 |
| Cu [weight %] | 17.7 | 17.2 | 18.4 | 18.4 | 18.1 | 18.7 | 18.4 | 16.7 | 17.8 | 18.5 | 17.8 | 18.8 |
| Zn [weight %] | 82.2 | 82.4 | 81.4 | 81.5 | 81.8 | 81.1 | 81.4 | 83.1 | 81.9 | 81.5 | 82.0 | 81.0 |
| phase | | | | | | $\epsilon$ | | | | | | |

Referring to Table 1, it can be seen that the periphery of the electrode wire according to Embodiment 1, that is the second covering layer, are formed of a (β+γ) phase copper-zinc alloy. However, referring to Table 2, it can be seen that the periphery of the electrode wire according to Comparative Embodiment 1 is formed of an ε phase copper-zinc alloy.

Referring to the above Table 1 and Table 2, it can be seen that the ε phase of the periphery of the electrode wire is transformed into a (β+γ) phase by the heat-treating step. And, it is predictable that a thin oxidation layer is formed on the periphery of the electrode wire according to Embodiment 1 considering the content of oxide.

Hereinafter, the second electrode wire according to the present invention will be described in detail through Embodiment 2 and Comparative Embodiment 2. The below-mentioned Embodiment 2 is an exemplary embodiment and the present invention is not limited to this.

Embodiment 2

The electrode wire according to Embodiment 2 is manufactured by drawing the electrode wire according to Embodiment 1 in a diameter of 0.25 mm.

Comparative Embodiment 2

The electrode wire according to Comparative Embodiment 2 is manufactured by drawing the electrode wire according to Comparative Embodiment 1 in a diameter of 0.25 mm.

The compositions of the peripheries of the electrode wires according to Embodiment 2 and Comparative Embodiment 2 were measured and photographs of the electrode wires according to Embodiment 2 and Comparative Embodiment 2 were taken, respectively.

The compositions of the peripheries of the electrode wires according to Embodiment 2 and Comparative Embodiment 2 are shown in Table 3 and Table 4, respectively. These were analyzed at the peripheries of ten electrode wires according to Embodiment 2 and eleven electrode wires according to Comparative Embodiment 2 using energy dispersive X-ray spectrometry (EDS).

Referring to Table 3, it can be seen that the periphery of the electrode wire according to Embodiment 2 is formed of a (β+γ) phase copper-zinc alloy. However, referring to Table 4, it can be seen that the periphery of the electrode wire according to Comparative Embodiment 2 is formed of a copper-zinc alloy having various phases, that is, α phases, β phases, γ phases, (γ+ε) phases, and ε phases.

Here, it can be seen that the periphery of an electrode wire according to Embodiment 2 is uniformly formed of a (β+γ) phase copper-zinc alloy. On the other hand, the periphery of an electrode wire according to Comparative Embodiment 2 is formed of one of various phases since the coating layer having low ductility irregularly separates at the drawing step.

Figure 10:
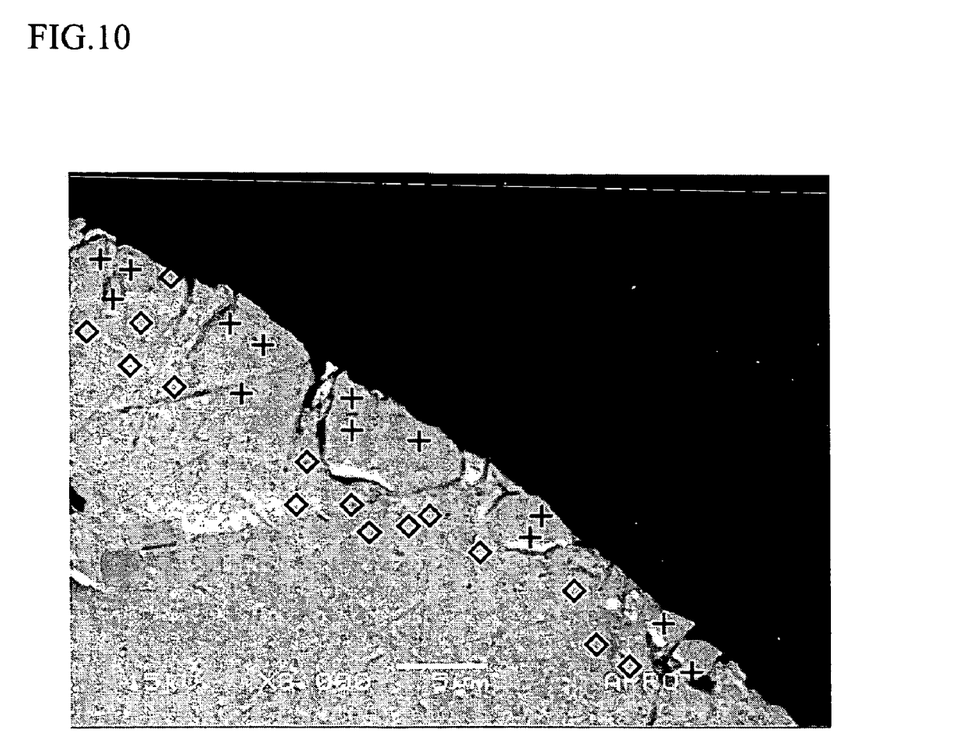
FIG. 10 is a photograph taken with 3000 times magnification of a cross section of an electrode wire of Embodiment 2 of the present invention.
Figure 11A:
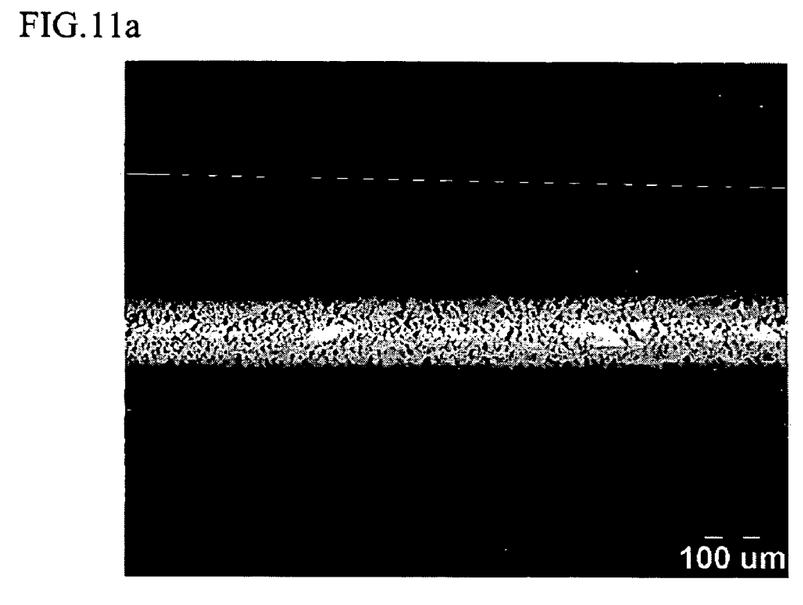
FIG. 11a is a photograph taken with 200 times magnification of a periphery of the electrode wire of Embodiment 2 of the present invention.
Figure 11B:
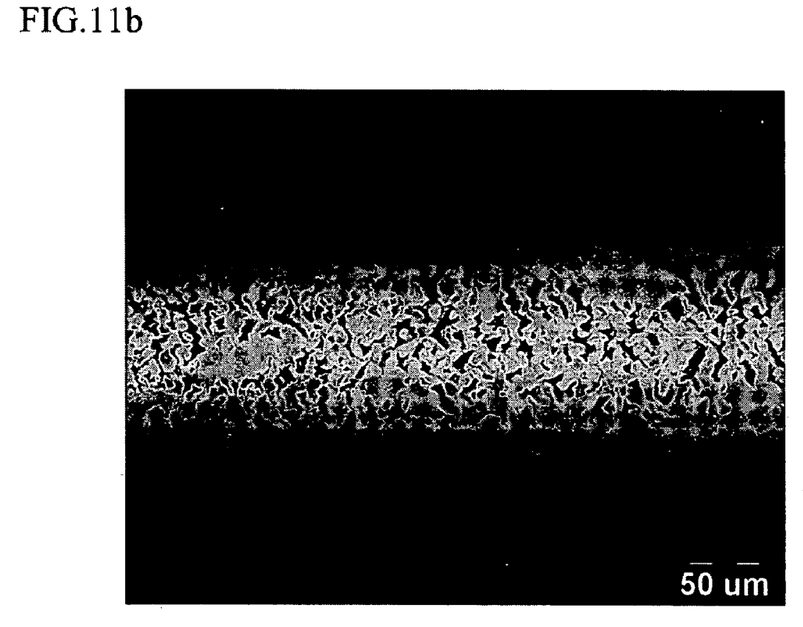
FIG. 11b is a photograph taken with 500 times magnification of the periphery of the electrode wire of Embodiment 2 of the present invention.
Figure 12A:
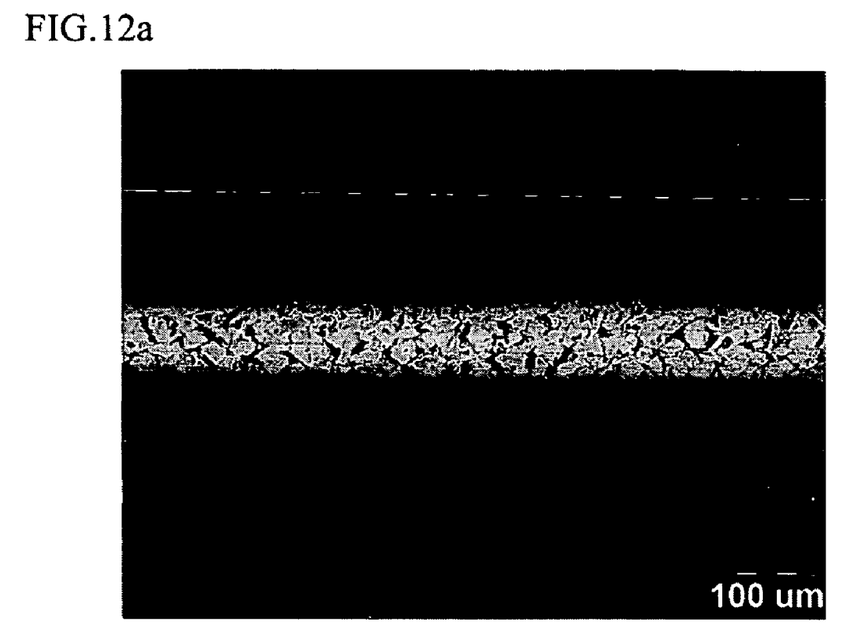
FIG. 12a is a photograph taken with 200 times magnification of a periphery of an electrode wire of Comparative Embodiment 2.
Figure 12B:
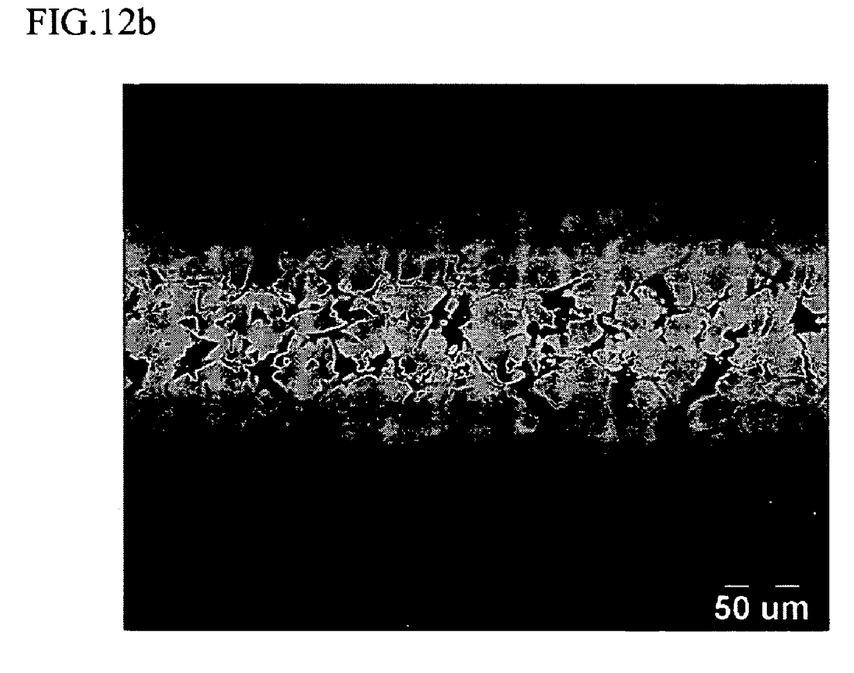
FIG. 12b is a photograph taken with 500 times magnification of the periphery of the electrode wire of Comparative Embodiment 2.

FIG. 10 is a photograph taken with 3000 times magnification of a cross section of the electrode wire of Embodiment 2 of the present invention. Here, "x" in FIG. 10 designates grains on the periphery and "□" in FIG. 10 designates the covering layer surrounding the core. FIG. 11a and FIG. 11b are photographs taken with 200 times and 500 times magnification of the periphery of the electrode wire of Embodiment 2 of the present invention, respectively. FIG. 12a and FIG. 12b are photographs taken with 200 times and 500 times magnification of the periphery of the electrode wire of Comparative Embodiment 2, respectively.

Referring to FIG. 10, FIG. 11a, and FIG. 11b, the grains are spaced apart from one another by a predetermined gap and uniformly disperse at the periphery of the electrode wire according to Embodiment 2. It can be seen that the portion of the covering layer exposed between the grains and the covering layer surrounds the grains. However, referring to FIG. 12a and FIG. 12b, grains form large lumps at the periphery of the electrode wire according to Comparative Embodiment 2.

This is because the periphery of the electrode wire according to Embodiment 1 is formed of (β+γ) phase having high strength. Accordingly, grains on the periphery can uniformly separate from one another, and isolated grains can regularly infiltrate inside of the covering layer of the electrode wire according to Embodiment 2.

On the other hand, the periphery of the electrode wire according to Comparative Embodiment 1 is formed of soft ε

TABLE 3

|  | 1 | 2 | 3 | 4 | 5 | 6 | 7 | 8 | 9 | 10 |
|---|---|---|---|---|---|---|---|---|---|---|
| O [weight %] | 0.40 | 0.40 | 0.45 | 0.30 | 0.39 | 0.31 | 0.28 | 0.41 | 0.30 | 0.38 |
| Al [weight %] | 0.09 | 0.15 | 0.24 | 0.01 | 0.10 | 0.31 | 0.01 | 0.22 | 0.04 | 0.11 |
| Cu [weight %] | 42.9 | 42.2 | 41.1 | 41.4 | 42.5 | 42.6 | 42.8 | 41.8 | 43.0 | 42.1 |
| Zn [weight %] | 56.7 | 57.4 | 58.5 | 58.3 | 57.1 | 57.1 | 56.9 | 57.8 | 56.7 | 57.5 |
| phase | | | | | β + γ | | | | | |

TABLE 4

|  | 1 | 2 | 3 | 4 | 5 | 6 | 7 | 8 | 9 | 10 | 11 |
|---|---|---|---|---|---|---|---|---|---|---|---|
| Al [weight %] | 0.00 | 0.00 | 0.3 | 0.12 | 0.26 | 0.11 | 0.00 | 0.33 | 0.84 | 0.08 | 0.11 |
| Cu [weight %] | 16.7 | 64.1 | 31.4 | 64.5 | 26.2 | 17.7 | 35.5 | 17.5 | 53.5 | 16.4 | 16.4 |
| Zn | 83.8 | 35.9 | 68.3 | 35.4 | 73.5 | 82.8 | 64.5 | 82.8 | 45.7 | 83.5 | 83.5 |
| phase | ε | α | γ+ε | α | γ+ε | ε | γ | ε | β | ε | ε | phase. Accordingly, grains of the coating layer are shoved at the drawing step and the grains form lumps on the periphery thereof.

As mentioned above, the electrode wire according to Embodiment 2 has minute grains uniformly dispersing, and thus the tensile strength thereof improves. Also, since isolated grains are infiltrated inside of the covering layer, the adhesion force of the electrode wire according to Embodiment 2 is enhanced.

In addition, according to separate experiments, the tensile strength of the electrode wire according to Embodiment 2 increases in an amount ranging from 2.1 to 22.1% compared with electrode wires on the market. Similarly, the electrical conductivity of the electrode wire according to Embodiment 2 increases in an amount ranging from 16.3 to 26.3% compared with electrode wires on the market.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electrode wire for electric discharge machining, comprising:
   a core;
   a covering layer formed on a periphery of the core; and
   grains formed on the covering layer, wherein the grains comprise a copper-zinc alloy including about 0.01 to 0.5 weight % of at least one additive element selected from the group consisting of aluminum, tin, magnesium, lanthanum, cerium, nickel, manganese, titanium, and zirconium,
   wherein the core comprises copper and a trace of unavoidable impurities, or comprises about 10 to 40 weight % of zinc, with the balance being of copper and a trace of unavoidable impurities,
   wherein the covering layer comprises about 37 to 49.5 weight % of zinc, with the balance being of copper and a trace of unavoidable impurities,
   wherein the grains comprise about 49.5 to 58 weight % of zinc, and about 0.01 to 0.5 weight % of the at least one additive element, with the balance being of copper and a trace of unavoidable impurities, and
   wherein the grains are spaced from one another on a periphery of the covering layer and the covering layer is formed between the grains to surround the grains.

2. The electrode wire of claim 1, further comprising an oxide layer covering the grains and a portion of the covering layer which is exposed between the grains.

3. The electrode wire of claim 1, wherein the covering layer has a thickness of about 2 to 3 μm.

4. The electrode wire of claim 1, wherein the electrode wire has a diameter of about 0.15 to 0.3 mm.

5. An electrode wire for electric discharge machining, comprising:
   a core;
   a covering layer formed on a periphery of the core; and
   grains formed on the covering layer, wherein the core comprises copper or an a phase copper-zinc alloy, the covering layer comprises an (alpha+beta) phase copper-zinc alloy or a beta phase copper-zinc alloy, and the grains comprise a (beta+gamma) phase copper-zinc alloy,
   wherein the grains are spaced from one another on a periphery of the covering layer and the covering layer is formed between the grains to surround the grains.

6. The electrode wire of claim 5, wherein the grains have an average grain size of about 3 to 5 μm.

7. The electrode wire of claim 5, wherein the covering layer has a thickness of about 2 to 3 μm.

8. A manufacturing method of an electrode wire for electric discharge machining, comprising steps of:
   forming a coating layer on a periphery of a core comprising copper or a copper-zinc alloy by dipping the core in a galvanizing bath of molten zinc including about 0.01 to 0.5 weight % of at least one additive element selected from the group consisting of aluminum, copper, tin, magnesium, lanthanum, cerium, nickel, manganese, titanium, and zirconium;
   performing heat treatment on the core having the coating layer at about 300 to 950° C.;
   drawing the electrode wire is further included after the step of performing heat treatment; and
   annealing the electrode wire at about 400 to 500° C. is further included after the step of drawing,
   wherein the electrode wire comprises:
   a core;
   a covering layer formed on a periphery of the core; and
   grains formed on the covering layer, wherein the grains comprise a copper-zinc alloy including about 0.01 to 0.5 weight % of at least one additive element selected from the group consisting of aluminum, tin, magnesium, lanthanum, cerium, nickel, manganese, titanium, and zirconium,
   wherein the core comprises copper and a trace of unavoidable impurities, or comprises about 10 to 40 weight % of zinc, with the balance being copper and a trace of unavoidable impurities,
   wherein the covering layer comprises about 37 to 49.5 weight % of zinc, with the balance being of copper and a trace of unavoidable impurities,
   wherein the grains comprise about 49.5 to 58 weight % of zinc, and about 0.01 to 0.5 weight % of the at least one additive element, with the balance being of copper and a trace of unavoidable impurities, and
   wherein the grains are spaced from one another on a periphery of the covering layer and the covering layer is formed between the grains to surround the grains.

9. The method of claim 8, wherein during the step of performing the heat treatment, the core having the coating layer is passed through a thermos tunnel.

* * * * *